United States Patent [19]

Higashimura et al.

[11] 3,857,991

[45] Dec. 31, 1974

[54] EARTH RESISTANCE-REDUCING AGENT AND METHOD OF REDUCING EARTH RESISTANCE BY USE OF SAME

[75] Inventors: Einosuke Higashimura, Tokyo; Yukihiko Sekimoto, Sitama; Eizi Hatabu, Tokyo, all of Japan

[73] Assignees: Nitto Chemical Industry Co., Ltd.; Mitsubishi Rayon Co., Ltd., both of Tokyo, Japan

[22] Filed: Dec. 27, 1971

[21] Appl. No.: 212,658

[30] Foreign Application Priority Data
Dec. 29, 1970 Japan.............................. 46-12805
Nov. 5, 1970 Japan.............................. 45-96844

[52] U.S. Cl.................. 174/6, 252/518, 252/500, 252/62.2
[51] Int. Cl. ...................... H01r 3/06, H01b 1/06
[58] Field of Search .......... 260/29.6; 252/500, 518, 252/62.2, 317, 316, 8.58 M; 166/248

[56] References Cited
UNITED STATES PATENTS

| | | | |
|---|---|---|---|
| 2,255,817 | 9/1941 | Ruben............................. | 252/62.2 |
| 2,558,159 | 6/1951 | Sanick ............................ | 174/6 |
| 2,581,979 | 1/1952 | Standing......................... | 252/62.2 |
| 2,977,514 | 3/1961 | Myers et al..................... | 252/62.2 |
| 3,048,549 | 8/1962 | Adams............................ | 252/518 |
| 3,056,750 | 10/1962 | Pass.............................. | 252/511 |
| 3,067,367 | 12/1962 | Ross.............................. | 252/62.2 |

Primary Examiner—John D. Welsh
Attorney, Agent, or Firm—Armstrong, Nikaido & Wegner

[57] ABSTRACT

An earth resistance-reducing agent comprising an aqueous solution containing (1) at least one monomer selected from acrylamide, methacrylamide, sodium acrylate, potassium acrylate, ammonium acrylate, sodium methacrylate, potassium methacrylate, and ammonium methacrylate, (2) at least one water-soluble crosslinking monomer, (3) at least one electrolyte, (4) at least one water-soluble polymer, and (5) a redox catalyst. The earth resistance is reduced by pouring or injecting said earth resistance-reducing aqueous solution into the soil surrounding an earth electrode, and hardening said agent.

4 Claims, No Drawings

EARTH RESISTANCE-REDUCING AGENT AND METHOD OF REDUCING EARTH RESISTANCE BY USE OF SAME

This invention relates to a chemical treating agent for semi-permanently reducing the earth resistance, and to a method for reducing the earth resistance by use of said agent.

Electrical installations are provided with an earthing device for safety. However, in certain soils, it has been extremely difficult to obtain and maintain a satisfactory earth resistance. Such soils are, for example, those of the gravel bed, pebble bed, rocky land, lapilli region, volcanic ash region, and lava region. Furthere, in recent years, in order to improve the efficiency of transmission and distribution of power, an extra-high voltage transmission has been adopted, which requires in the earthing work a still lower earth resistance even in a clay loam.

As a means for reducing the earth resistance, a chemical treatment method has hitherto been known. According to this method, an inorganic electrolyte such as sodium chloride, magnesium sulfate, copper sulfate, magnesium chloride, calcium chloride, ammonium chloride, or the like, is injected into the soil surrounding the earth electrode to reduce the earth resistance. When this method is applied, the soil shows an extremely favorable earth resistance for some period after the treatment. However, the chemicals are carried away by surface run-off water and subsoil water during rainfall, and the effect of chemicals lasts only for a period ranging from several months in an extreme case to 3 years at the longest, the mean effective period being about 2 years. Accordingly, the chemical treatment must be repeated after a certain period. However, such repeated treatments, maintenance, and inspection are very difficult in remote and deserted places.

In order to improve the inferior durability of the earth resistance-reducing effect, there have recently been used retentive materials for the above-said inorganic electrolytes, such as silica gel and resins of a lignin type or a urea type. Also, earth resistance-reducing agents of an acrylamide type have become used for the same purpose. Such an acrylamide type earth resistance-reducing agent generally comprises acrylamide, a crosslinking agent, and a water-soluble electrolytic salt. The said agent has a considerably improved life of effect, but has such a defect that as the soil dries the internal strain of the gel formed from said agent tends to increase and the gel begins to shrink, resulting in the formation of cracks. Once the formation of cracks starts, the earth resistance in the surrounding of the electrode such as an earth rod or earth plate increases markedly owing to the voids resulting from cracks. Moreover, the loss of electrolytes from the gel is increased owing to percolation through the cracks and it becomes difficult to maintain the effect of the electrolyte for a long period of time.

The present inventors have conducted studies on semi-permanent retention of the earth resistance-reducting effect, and, as a result, have accomplished the present invention.

An object of this invention is to provide an excellent earth resistance-reducing agent. Another object of the invention is to provide a method for maintaining an excellent earth resistance-reducing effect for a long period of time. A further object of the invention is to impart to the soil surrounding the earth electrode an outstanding impermeability to water and an excellent conductivity. A still further object of the invention is to prevent the formation of cracks in the surrounding of the earth electrode when dried, so that the fluctuation of earth resistance may not result from changes in climate and rainfall.

Other objects and advantages of this invention will be apparent from the following description.

According to this invention, there is provided an earth resistance-reducing agent comprising an aqueous solution containing (1) at least one monomer selected from the group consisting of acrylamide, methacrylamide, sodium acrylate, potassium acrylate, ammonium acrylate, sodium methacrylate, potassium methacrylate, and ammonium methacrylate, (2) at least one water-soluble crosslinking monomer, (3) at least one electrolyte, (4) at least one water-soluble polymer, and (5) a redox catalyst.

This invention further provides a method for reducing the earth resistance in the surrounding of an earth electrode, which comprises injecting or pouring the said aqueous solution of the earth resistance-reducing agent into the soil surrounding the earth electrode, and hardening said agent.

In this invention, acrylamide is preferably contained as the component (1) in the earth resistance-reducing agent though it is not critical.

Examples of the water-soluble crosslinking monomers for use in this invention include methylenebisacrylamide, methylenebismethacrylamide, 1,3-di(acrylamidomethyl)-2-imidazolidone, 1,3-di(methacrylamidomethyl)-2-imidazolidone, diacrylamidomethylethyleneurea, diacrylamido-dimethyl ether, hexahydro-1,3,5-triacyl-S-triazine, and polyvalent metal salts of acrylic acids. Other water-soluble crosslinking monomers may also be optionally used.

As the electrolyte in this invention, there may be used any electrolyte, but preferred are sodium chloride, potassium chloride, calcium chloride, magnesium chloride, ammonium chloride, copper sulfate, magnesium sulfate, iron sulfate, sodium nitrate, potassium nitrate, and sodium sulfamate. These electrolytes may be used in combination of two or more.

In this invention, the presence of a water-soluble polymer is necessary. The presence of said water-soluble polymer enables solidified gel to be given tackiness and a drying-resistance, and results secondarily in the enhancement of the electrolyte-retentivity, so that cracks due to drying become very difficult to cause and the excellent earth resistance-reducing effect can be maintained for a prolonged period of time.

The water-soluble polymer which answers such a purpose should have the following properties:

1. compatibility with an aqueous solution of the other components of the earth resistance-reducing agent:
2. no interference with polymerizability of the earth resistance-reducing agent;
3. no deterioration of the electric conductivity of the formed gel;
4. ability to enhance the tackiness of the formed gel and to decrease the residual internal strain;
5. excellent water-retentivity and drying-resistance; and
6. excellent electrolyte-retentivity.

Examples of preferable polymers which meet the above-said requirements include natural polymers or derivatives thereof such as raw starch, oxidized starch, α-starch, carboxymethylcellulose, and hydroxyethylcellulose; synthetic homopolymers of such monomers as acrylamide, methacrylamide, sodium acrylate, potassium acrylate, ammonium acrylate, sodium methacrylate, potassium methacrylate, ammonium methacrylate, acrylates of lower alcohols (the lower alcohols having three or less carbon atoms), and methacrylates of lower alcohols (the lower alcohols having three or less carbon atoms); and copolymers of any combination of said monomers.

Further, polyethylene oxides, block copolymers of propylene oxide and ethylene oxide, and polyethylene imines can be used as the water-soluble polymers. Among these water-soluble polymers, there are particularly preferred hydroxyethylcellulose, polyacrylamide, polyethylene oxide, and copolymers of any monomer arbitrarily selected from acrylamide, methacrylamide, sodium acrylate, potassium acrylate, ammonium acrylate, sodium methacrylate, potassium methacrylate, ammonium methacrylate, and methyl acrylate.

These water-soluble polymers may also be used, if necessary, in combination of two or more.

The amount of the water-soluble polymer used may be varied depending upon the kind thereof and the combination with the other components of the earth resistance-reducing agent, and cannot generically be defined. It is, however, usually used in an amount of 0.01 to 5% by weight based on the total weight of the components other than the water-soluble polymer. When these polymers are used in an amount exceeding 5% by weight, the viscosity of the resulting liquid preparation increases so much that the preparation becomes undesirable in view of workability.

The amount of the components other than the water-soluble polymer, used in the earth resistance-reducing agent is as shown below.

The amount of at least one monomer selected from the group consisting of acrylamide, methacrylamide, sodium acrylate, potassium acrylate, ammonium acrylate, sodium methacrylate, potassium methacrylate, and ammonium methacrylate is preferably such that 1 to 30% by weight of said monomer is present in the aqueous solution of the earth resistance-reducing agent at the time of application.

The preferable amount of the water-soluble cross-linking monomer used is such that 0.05 to 5% by weight of the monomer is present in the aqueous solution of the earth resistance-reducing agent at the time of application.

The electrolyte is used in an amount of from 0.5% by weight to the saturation point in the aqueous solution of the earth resistance-reducing agent at the time of application.

A redox catalyst is used as the polymerization catalyst for the present earth resistance-reducing agent. A usually known water-soluble system can be used as said redox catalyst. As the oxidizing component, there are used, for example, ammonium persulfate, potassium persulfate, sodium persulfate, and hydrogen peroxide. As the reducing component, there are used, for example, dimethylaminopropionitrile, triethanolamine, sodium thiosulfate, allylthiourea, etc. The amount of the redox catalyst used is such that each of the oxidizing and reducing components is present in an amount of 0.1 to 3% by weight, preferably 0.2 to 1% by weight, in the earth resistance-reducing agent at the time of application.

The earth resistance-reducing agent is an aqueous solution containing all of the components dissolved therein. However, as for the redox catalyst, it is desirable that the reducing component is used in admixture with other components of the agent and the oxidizing component is added to the mixture just before the application of the agent.

According to the present invention, a suitable procedure may be used in pouring or injecting the aqueous solution of the earth resistance-reducing agent into the soil surrounding the earth electrode. For example, an inverted cone-shaped hole or a cylindrical hole is dug out of the earthing ground; single or multiple earth rods are driven into the ground at the center of the hole; then an aqueous solution of the components of the earth resistance-reducing agent other than the oxidizing component of the redox catalyst, and the oxidizing component of the redox catalyst are poured in admixture into the hole; and finally the soil is replaced into the hole before the hardening of the mixed solution takes place. In this case, it is desirable to adjust the gel time to coincide with the time necessary for the greater part of said mixed aqueous solution to infiltrate into the soil in the surrounding of the earth electrode. In another procedure which may be adoptable, an earth rod is placed upright in a hole excavated by means of an auger, and then the above-said mixed solution is poured into the hole to cover completely the earth rod with a homogel of the earth resistance-reducing agent.

In repairing or improving the state of the installed earth electrode, it is feasible, if necessary, that a pipe is driven into the ground in the vicinity of the earth electrode, and the aqueous solution of earth resistance-reducing agent is pressure-injected through the pipe by means of an injection pump.

As the earth electrode, there may be suitably used a rod, plate, or wire mesh made of a conductive metal such as copper.

The earth electrode surroundings treated by the method of this invention are chemically stable, quite resistance to bacteria, acids and alkalis, and are able to maintain semi-permanently the earth resistance-reducing effect, substantially without being lost by rainfall, etc. Further, the electrode surroundings are distinguished in strength and impermeability to water, and as compared with the case where a conventional retentive material is used, not only the conductivity is superior but also no crack will be formed in dry state. Also, the fluctuation of the resistance due to seasonal changes of climate and rainfall is substantially negligible.

The invention is illustrated below with reference to Examples, which are merely illustrative and are not limitative. In the Examples, all parts are by weight unless otherwise specified.

EXAMPLE 1

In order to examine tackiness, drying resistance, and electrolyte-retention of the earth resistance-reducing agent according to the present invention, an accelerated test was carried out by alternately repeating washing with water and atmospheric drying.

A thimble, 10 mm in diameter and 150 mm in length, was packed with ballasts, 2.5 to 5 mm in size. Two spiral electrodes, 38 mm in outer diameter, made of annealed copper wire, 1.6 mm in diameter, were placed 100 mm apart in the ballast column, one in the upper part and the other at the bottom.

The above-said thimble was inserted in a methacrylic resin pipe, 45 mm in inner diameter and 200 mm in length. The lower end of the pipe was fitted with a rubber stopper. Into the pipe, was introduced an earth resistance-reducing agent in the form of a homogeneous aqueous solution containing 4.5 parts of acrylamide, 0.5 part of 1,3-di(acrylamidomethyl)-2-imidazolidone, 0.4 part of dimethylaminopropionitrile, 0.5 part of ammonium persulfate, 10 parts of sodium chloride, 95 parts of water, and 1 part of polyethylene oxide (hereinafter referred to as PEO), to infiltrate in the ballast column and form a gel therein. The thimble was taken out of the pipe and the gel adhered on the outer surface of the thimble was wiped away, to give a test specimen of the earth resistance-reducing agent. Five specimens were prepared and tested to obtain mean values of measurements.

For comparison, test specimens were prepared in a similar manner, except for omission of PEO.

The said specimen was placed in an elutriation tank, 360 × 360 × 140 mm, a constant voltage of 100 V was applied (a resistor of 100Ω being used in series), and an accelerated test was carried out by successively washing for 7 hours with water flowing at a rate of 400 cc/sec., standing in air for 12 hours, washing with water for 3 hours, standing in air for 500 hours, and washing with water for 4 hours. The change in electric conductivity (in terms of amperage) in each phase of the said treatments was measured to obtain the results as shown in Table 1.

As a measure to examine drying resistant property of the gel, the dehydration degree of the gel was determined after the said earth resistance-reducing agent placed in a Petri dish, 84 mm in diameter, as a layer of 2 mm in depth had been left standing in a chamber at a constant temperature of 25°C and at a constant relative humidity of 45%.

As is seen from Table 1, as compared with a conventional reducing agent the earth resistance-reducing agent of this invention showed a higher conductivity in the accelerated elutriation test because of superior electrolyte retentive property, and further showed also a higher conductivity in the case of standing in air because of sufficient tackiness and drying resistant property, indicating a more long-lasting effect in reducing the earth resistance.

fate, 10 parts of ammonium sulfate, 95 parts of water, and 2 parts of polyacrylamide (mean molecular weight 120,000) was polymerized. The addition of polyacrylamide showed neither adverse effect on the uniformity of polymerization of the monomers nor a pronounced effect on the conductivity of the gel formed. It was possible to form a gel having a high tackiness, a low residual internal strain, and a drying resistant property (see Table 2).

Table 2

| Water-soluble polymer added | Gel time at 20°C | Resistivity of gel, Ω – cm | Tackiness | Uniformity of polymerization |
|---|---|---|---|---|
| None | 1 min. 53 sec. | 11.4 | Fair | Good |
| Polyacrylamide Mol. wt. 120,000 | 1 min. 57 sec. | 11.8 | Excellent | Good |

EXAMPLE 3

20 Liters of an earth resistance-reducing agent comprising 4.75 parts of acrylamide, 0.25 part of methylenebisacrylamide, 0.4 part of dimethylaminopropionitrile, 0.5 part of ammonium persulfate, 10 parts of ammonium sulfate, 86 parts of water, and 10 parts of an aqueous copolymer (which is a water-soluble polymer) solution comprising 7.9% by weight of acrylamide, 1.31% by weight of methyl acrylate and 0.76% by weight of sodium methacrylate, were poured into the earthing spot (where an inverted cone-shaped hole, 75 cm in depth, had been excavated and through the center of bottom of the hole a copper-clad earth rod, 14 mm in diameter and 1,500 mm in length, had been completely driven into the ground) provided in a riverside sandy gravel bed.

The influence of seasonal changes upon the earth resistance was a matter of concern, because among various soil beds, the riverside sandy gravel bed, in particular, is characterized by being exposed to a widely fluctuating water-level in accordance with dry seasons and rainy seasons. Nevertheless, because of tackiness and drying resistance property of the present reducing agent in dry seasons and of electrolyte retentive property of the present reducing agent in rainy seasons, the Table 1

| Water-soluble polymer added | Accelerated elutriation and drying test (ampere) | | | | | *Dehydration degree of gel. after 100 hours. % |
|---|---|---|---|---|---|---|
| | Washed with water for 7 hrs. | Standing in air for 12 hrs. | Washed with water for 3 hrs. | Standing in air for 500 hrs. | Washed with water for 4 hrs. | |
| None | 0.746 | 0.795 | 0.686 | 0.455 | 0.418 | 47.5 |
| PEO | 0.812 | 0.842 | 0.743 | 0.610 | 0.618 | 42.2 |

Note:-
*Dehydration degree of gel = (Weight of gel immediately after formation) – (Weight of gel after 100 hours)/(Weight of gel immediately after formation) × 100%

EXAMPLE 2

A mixture comprising 4.6 parts of acrylamide, 0.4 part of methylenebisacrylamide, 0.4 part of dimethylaminopropionitrile, 0.5 part of ammonium persulearthing spot, where the reducing agent of this invention had been applied, showed a remarkably unchanged earth resistance of 25 ohms even after about 2 years service, as compared with an earth resistance of 300 ohms in the case of an untreated bed.

EXAMPLE 4

40 Liters of an earth resistance-reducing agent comprising 5 parts of acrylamide, 0.35 part of ammonium acrylate, 1.25 parts of sodium methacrylate, 0.5 part of methylenebisacrylamide, 0.5 part of ammonium persulfate, 0.4 part of dimethylaminopropionitrile, 10 parts of sodium chloride, 95 parts of water, and 5 parts of hydroxyethylcellulose were poured into the earthing spot (where a pit, 2 m × 50 cm × 75 cm (depth), had been excavated and an earth rod, 10 mm in diameter and 1,500 mm in length, had been laid horizontally on the middle part of the bottom of said pit) provided in a soil bed intermingled with volanic rocks, and thereafter the soil was replaced in the pit.

Particularly in a soil bed intermingled with volanic rocks, among various soil beds, it is impossible to drive an earth rod into the ground. In such a case, it is necessary to enlarge the earthing area by the use of an earth resistance-reducing agent as mentioned above. There has been apprehensions by the conventional earthing work about the formation of cracks in the gel owing to drying and the carry-off of the reducing agent by rainfall, both of which are enhanced with enlargement of the surface area of the reducing agent. Nevertheless, the earth resistance reduced according to this invention was maintained at 60 ohms even after 2 years service, as compared with the earth resistance of 280 ohms in the case of untreated soil.

EXAMPLE 5

20 Liters of an earth resistance-reducing agent comprising 18.44 parts of sodium acrylate, 1.71 parts of magnesium acrylate, 0.4 part of dimethylaminopropionitrile, 0.5 part of ammonium persulfate, 2 parts of sodium chloride, 0.2 part of sodium sulfate, 76 parts of water, and 1 part of oxidized starch were poured into the earthing spot (where an inverted cone-type hole had been excavated and two earth electrodes, each 10 mm in diameter and 1,500 mm in length, made of a copper-clad steel rod, had been completely driven into the ground through the center of bottom of the hole) provided in a sandy gravel bed. A sticky and homogeneous gel was formed. The earth resistance was reduced from 260 ohms prior to said treatment to 80 ohms, and was maintained at 75 ohms even after about 1 year, indicating a stable resistivity.

EXAMPLE 6

60 Liters of an earth resistance-reducing agent comprising 5 parts of acrylamide, 1 part of sodium methacrylate, 0.3 part of methylenebisacrylamide, 10 parts of sodium chloride, 0.4 part of dimethylaminopropionitrile, 0.5 part of ammonium persulfate, 96 parts of water, and 1 part of α-starch were poured into an earthing spot (where a cylindrical hole, 300 mm in diameter and 1.5 m in depth, was excavated by means of an earth auger and a copper-clad steel rod, 10 mm in diameter and 1,500 mm in length, was completely inserted at the center of the hole) provided in a sandy gravel bed. There was formed a uniform conductive gel with high stickiness and a highly drying-resistant property. The earth resistance was reduced from 198 ohms prior to the treatment to 11 ohms and was maintained unchanged for a period of about 1 year.

EXAMPLE 7

20 Liters of an earth resistance-reducing agent comprising 4.5 parts of acrylamide, 0.5 part of 1,3-di(acrylamidomethyl)-2-imidazolidone, 10 parts of ammonium sulfate, 0.4 part of dimethylaminopropionitrile, 0.5 part of ammonium persulfate, 94 parts of water, and 1 part of oxidized starch were poured into an earthing spot (where an inverted cone-shaped hole, 75 cm in depth, had been excavated and an earth electrode, 10 mm in diameter and 1,500 mm in length, made of a copper-clad steel rod had been completely driven into the ground through the center of bottom of the hole) provided in a farm-land. A gel with high stickiness and a highly drying-resistant property was formed. The earth resistance was reduced from 370 ohms prior to the treatment to 78 ohms even after about 1 year, indicating a favorable effect.

What is claimed is:

1. A process for reducing the earth resistance in the soil surrounding an earth electrode which comprises treating the soil surrounding said earth electrode with an earth resistance-reducing agent consisting essentially of an aqueous solution of:
    i. 1 to 30% by weight of at least one monomer selected from the group consisting of acrylamide, ammonium acrylate, sodium acrylate and sodium methacrylate;
    ii. 0.05 to 5% by weight of at least one water-soluble crosslinking monomer selected from the group consisting of methylenebisacrylamide and 1,3-di(acrylamidomethyl)-2-imidazolidone;
    iii. at least 0.5% by weight to the saturation amount of at least one electrolyte selected from the group consisting of sodium chloride and ammonium sulfate;
    iv. 0.1 to 3% by weight of each of an oxidizing component selected from the group consisting of ammonium persulfate, potassium persulfate, sodium persulfate and hydrogen peroxide and a reducing component selected from the group consisting of dimethylaminopropionitrile, triethanolamine, sodium thiosulfate and allylthiourea of a redox catalyst; and
    v. 0.01 to 5% by weight, based on the weight of the components (i), (ii), (iii), and (iv), of at least one water-soluble polymer selected from the group consisting of hydroxyethylcellulose, polyacrylamide, polyethylene oxide, and a copolymer of at least two monomers selected from the group consisting of acrylamide, methacrylamide and sodium acrylate, potassium acrylate, ammonium acrylate, sodium methacrylate, potassium methacrylate, ammonium methacrylate, and methyl acrylate.

2. The process of claim 1 which comprises
    i. pouring the earth resistance-reducing agent into an inverted cone-shaped hole in which an earth rod is driven into the ground at the bottom or into a hole formed by an earth auger in whcih an earth rod is placed upright, and
    ii. replacing the soil into the hole before the hardening of the agent.

3. The process of claim 1 wherein the water soluble polymer is hydroxyethylcellulose, polyacrylamide or polyethylene oxide.

4. The process of claim 1 wherein the water soluble polymer is a copolymer of at least two monomers selected from the group consisting of acrylamide, methacrylamide and sodium methacrylate.

* * * * *